(12) United States Patent
Jang et al.

(10) Patent No.: US 9,109,699 B2
(45) Date of Patent: Aug. 18, 2015

(54) STRUCTURE FOR MOUNTING PISTON RING

(71) Applicant: Hyundai Motor Company, Seoul (KR)

(72) Inventors: Mun Hwee Jang, Whasung-si (KR); Jin Tae Kim, Whasung-si (KR); Yeon Ho Shin, Whasung-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 394 days.

(21) Appl. No.: 13/710,343

(22) Filed: Dec. 10, 2012

(65) Prior Publication Data

US 2014/0109764 A1   Apr. 24, 2014

(30) Foreign Application Priority Data

Oct. 23, 2012 (KR) .................. 10-2012-0118110

(51) Int. Cl.
 *F16J 9/24* (2006.01)
 *F16J 1/04* (2006.01)

(52) U.S. Cl.
 CPC ...... *F16J 1/04* (2013.01); *F16J 9/24* (2013.01)

(58) Field of Classification Search
 CPC .................. F16J 9/00; F16J 9/02; F16J 9/12; F16J 9/069; F16J 9/24; F16J 15/18; F02J 5/00
 USPC ........................................................... 92/172
 See application file for complete search history.

(56) References Cited

U.S. PATENT DOCUMENTS

| | | | | |
|---|---|---|---|---|
| 1,369,592 A | * | 2/1921 | White | 277/434 |
| 1,956,513 A | * | 4/1934 | Neault et al. | 277/446 |
| 2,300,518 A | * | 11/1942 | Phillips | 277/446 |
| 2,428,177 A | * | 9/1947 | Phillips | 277/445 |
| 4,570,945 A | * | 2/1986 | Hayashi | 277/486 |
| 4,962,691 A | * | 10/1990 | Kanao | 277/445 |
| 5,211,102 A | * | 5/1993 | Muta | 92/208 |
| 5,664,536 A | * | 9/1997 | Bigsby | 123/193.4 |
| 6,457,721 B1 | * | 10/2002 | Bloemers et al. | 277/445 |
| 6,631,908 B2 | * | 10/2003 | Mittler et al. | 277/458 |
| 6,712,363 B2 | * | 3/2004 | Bennitt et al. | 277/489 |

FOREIGN PATENT DOCUMENTS

| | | |
|---|---|---|
| JP | 63-150055 U | 10/1988 |
| JP | 7-332156 A | 12/1995 |
| JP | 2002-122238 A | 4/2002 |
| JP | 2004-353760 A | 12/2004 |
| JP | 2007-292296 A | 11/2007 |
| KR | 1999-003222 U | 1/1999 |
| KR | 20-0159732 Y1 | 11/1999 |
| KR | 10-2005-0100462 A | 10/2005 |
| KR | 10-2011-0132333 A | 12/2011 |
| WO | WO 2010/084449 A1 | 7/2010 |

\* cited by examiner

*Primary Examiner* — Nathaniel Wiehe
*Assistant Examiner* — Dustin T Nguyen
(74) *Attorney, Agent, or Firm* — Morgan, Lewis & Bockius LLP

(57) ABSTRACT

A structure for mounting a piston ring mounted around a piston head of a piston is provided. The structure includes a ring groove formed along the piston head with a guide recess circumferentially formed in the ring groove in a certain section. The piston ring is rotatably fitted into the ring groove. A guide protrusion is formed on the piston ring and is provided in the section of the guide recess such that the guide protrusion is rotated within the section. The structure is configured such that when a plurality of piston rings is mounted around the piston head, rotation sections of the end gaps of the piston rings are not aligned with each other.

5 Claims, 6 Drawing Sheets

STRUCTURE FOR MOUNTING PISTON RING

CROSS-REFERENCE TO RELATED APPLICATION

The present application claims priority of Korean Patent Application Number 10-2012-0118110 filed Oct. 23, 2012, the entire contents of which application is incorporated herein for all purposes by this reference.

BACKGROUND OF INVENTION

1. Field of Invention

The present invention relates, in general, to a structure for mounting a piston ring, and, more particularly, to a structure for mounting a piston ring, which when a plurality of piston rings is mounted around a piston head, allows end gaps formed in the piston rings to rotate at different sections in a circumferential direction of the piston head, thereby preventing the end gaps from being aligned and thus reducing a blow-by gas.

2. Description of Related Art

Generally, a phenomenon "blow-by" occurs when a small amount of fuel-air mixture escapes between a cylinder wall and a piston during normal operation of an internal combustion engine, and the fuel-air mixture is referred to as "blow-by gas".

Such blow-by occurs in most automobiles, and a piston ring and engine oil perform a sealing function in order to minimize blow-by.

FIG. 1 shows a structure for mounting piston rings according to the related art.

Referring to FIG. 1, a plurality of ring grooves 1a is formed along a circumferential direction of a piston head 1, and piston rings 2 are respectively fitted into the ring grooves 1a. Here, the piston ring is provided with an end gap 2a in the form of a partially-cut section. The piston rings 2 are freely rotated in ring grooves 1a during normal operation of an engine.

However, when end gaps of the piston rings coincide with each other during rotating operation, an amount of blow-by gas considerably increases to cause turbo fouling and degradation in post-treatment.

In order to solve this problem, a technique in which stoppers are formed in the ring grooves so as to prevent the piston rings from rotating has been proposed. However, in this case, since the piston rings cannot rotate, one-sided wear of a piston and adhesion of piston rings occur and therefore a scuffing phenomenon occurs on the piston.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art, and the present invention attempts to propose a structure for mounting a piston ring, which when a plurality of piston rings is mounted around a piston head, allows end gaps formed in the piston rings to rotate at different sections in a circumferential direction of the piston head, thereby preventing the end gaps from being aligned in a line and thus reducing a blow-by gas.

Various aspects of the present invention provide for a structure for mounting a piston ring mounted around a piston head of a piston, wherein the piston ring has an end gap between both end sides thereof, the structure including a ring groove formed along a circumference of the piston head with a guide recess circumferentially formed in an outer wall of the ring groove in a certain section, wherein the piston ring is rotatably fitted into the ring groove, and a guide protrusion formed on an inner circumference of the piston ring and provided in the section of the guide recess such that the guide protrusion is rotated within the section, wherein the structure is configured such that when a plurality of piston rings is respectively mounted into the guide recesses around the piston head, rotation sections of the end gaps of the piston rings are not aligned with each other.

The guide protrusion may be formed on an end side of the piston ring.

The guide protrusion may be formed on both end sides of the piston ring.

The structure may be configured such that when the plurality of piston rings is mounted around the piston head, the section of the guide recess in one ring groove does not coincide with the sections of the guide recesses in the other ring groove.

The structure may be configured such that when the plurality of piston rings is mounted around the piston head, the sections of the guide recesses formed in the respective ring grooves are provided at regular intervals in a circumferential direction of the piston head.

According to the present invention, the guide protrusion is provided within a section of the guide recess such that the guide protrusion is adjacent the end gap of the piston ring, so that respective rotation sections of the end gaps of the respective piston rings do not overlap with each other even when the piston rings are rotated, thereby having the effect of reducing blow-by gas.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
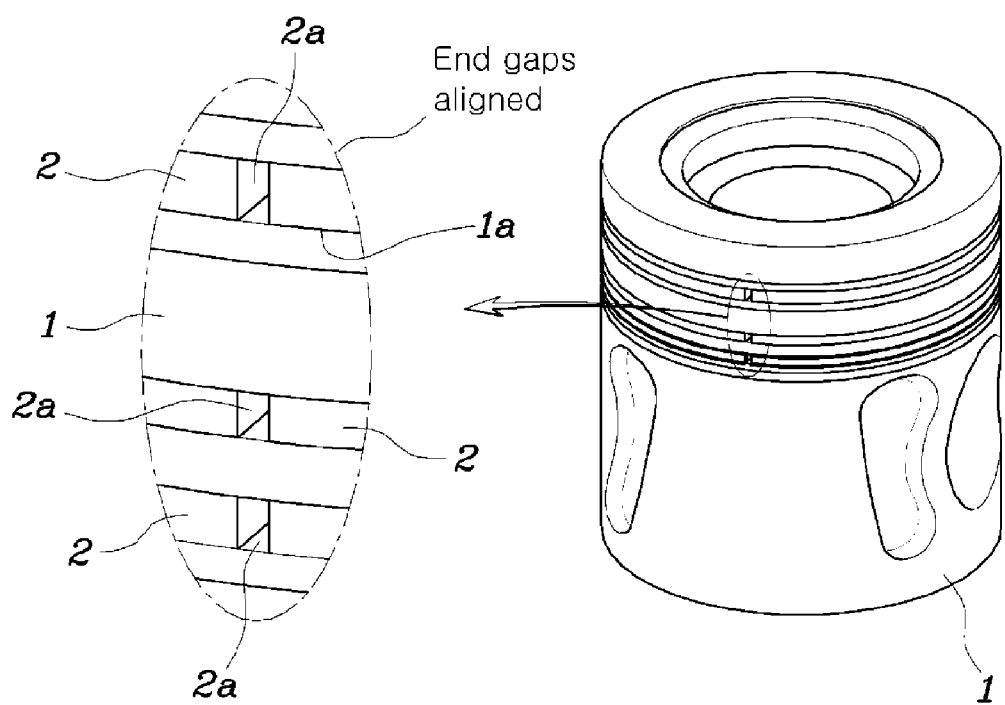
FIG. 1 is a view showing the state of a piston head being fitted with piston rings with end gaps aligned with each other according to the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A structure for mounting a piston ring shown in FIGS. 2 to 7 generally includes a mounting structure for a piston 10 and the piston ring 18.

Specifically, the piston 10 includes a ring groove 14 in a circumferential direction, and the ring groove is provided in an outer wall thereof with a guide recess 16 in a certain section or predefined angular region along the circumference thereof. The piston ring 18 has a guide protrusion 20 on an inner circumferential surface. The piston ring is rotatably fitted into the ring groove 14 such that the guide protrusion 20 is provided within the section of the guide recess 16 so that the guide protrusion is moved and rotated within the section.

Here, the mounting structure is configured such that when a plurality of piston rings 18 is mounted around the piston head 12, the rotation section of an end gap 18a formed in a certain piston ring or selected one(s) of the piston rings does not overlap with those of end gaps 18a of the other piston rings 18.

Figure 2:
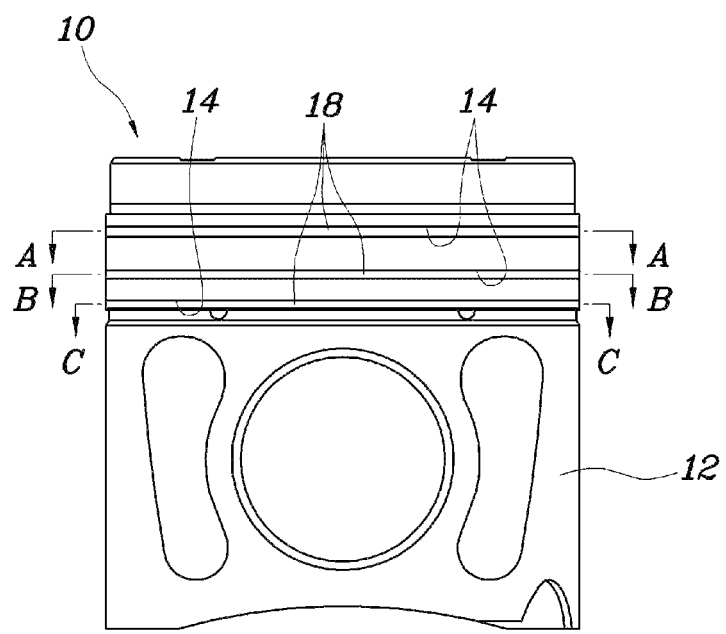
FIG. 2 is a front view showing the state of an exemplary piston head being fitted with piston rings according to the present invention.
Figure 3:
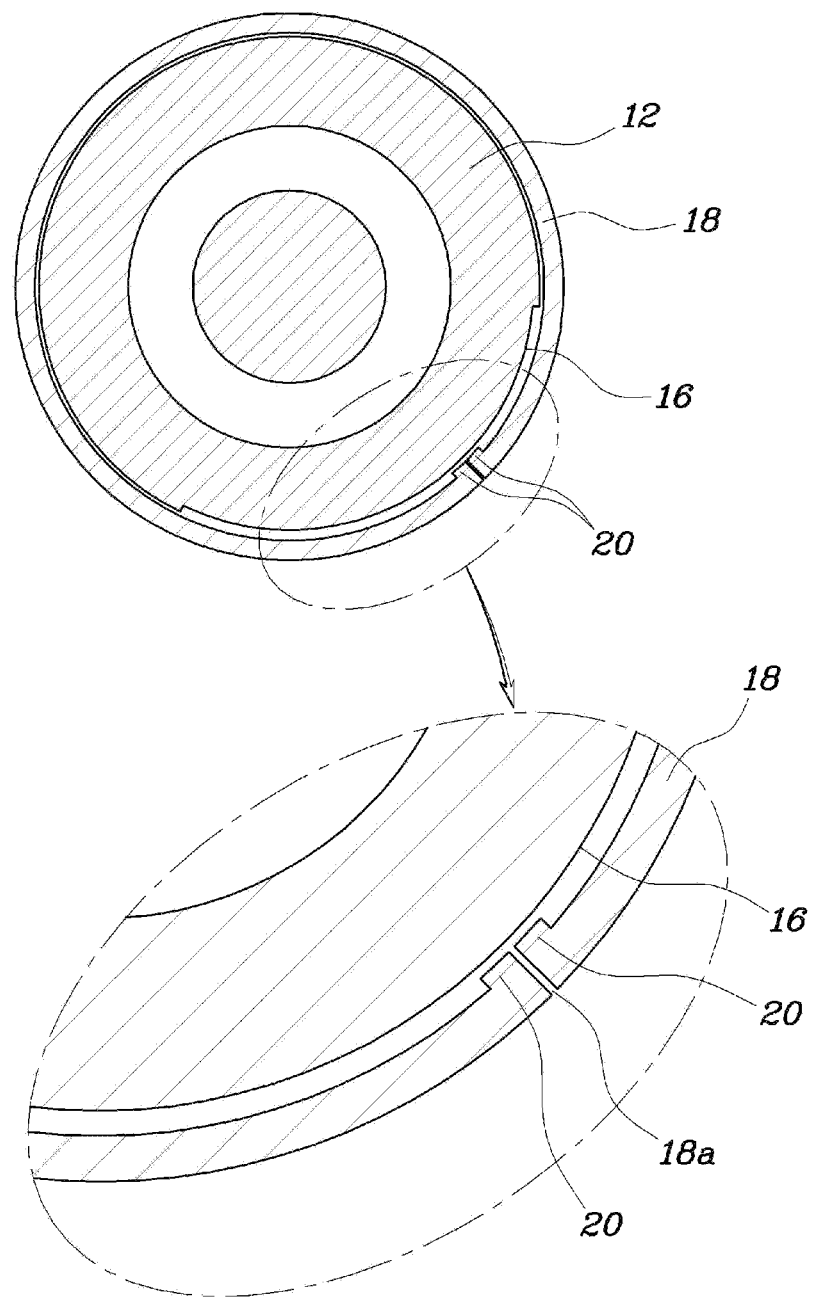
FIG. 3 is a cross-sectional view showing the state of an exemplary piston head being fitted with the piston ring according to the present invention.
Figure 4:
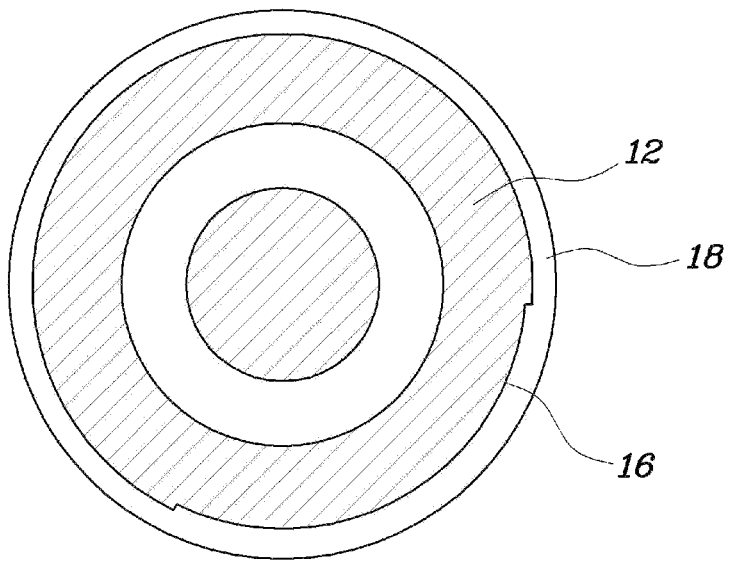
FIG. 4 is a view showing the state of the piston head and the piston ring shown in FIG. 3 being disassembled.
Figure 4:
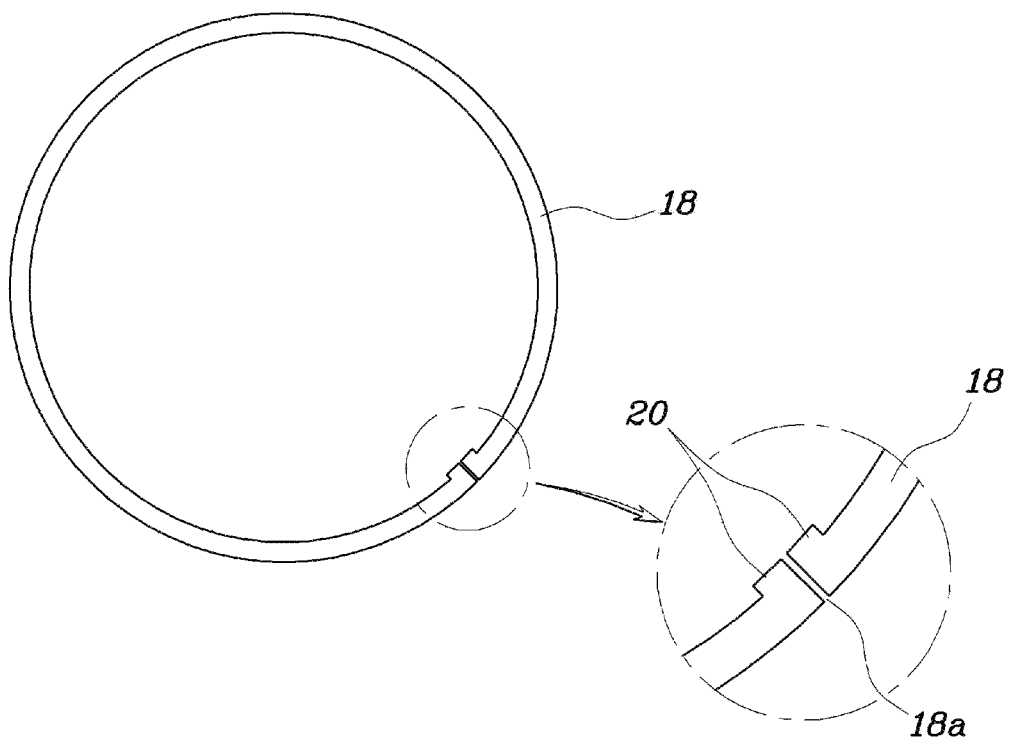
Figure 5:
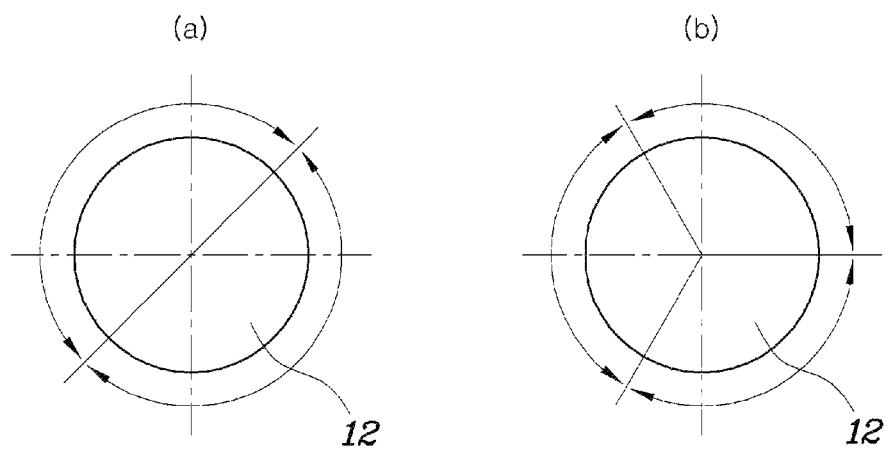
FIGS. 5A and 5B are views explaining the structures of guide recesses according to the number of piston rings to be mounted according to the present invention.

FIG. 2 is a front view showing the state of the piston head 12 being fitted with piston rings 18 according to the present invention, FIG. 3 is a cross-sectional view showing the state of the piston head 12 being fitted with the piston ring 18 according to the present invention, and FIG. 4 is a view showing the state of the piston head 12 and the piston ring 18 shown in FIG. 3 being disassembled.

Referring to FIGS. 2 to 4, the piston 10 is provided with a cylindrical piston head 12 in the upper side thereof, in which at least two ring grooves 14 are formed in a circumferential direction thereof. A guide recess 16 in the form of a cutout is circumferentially formed in an outer wall of the ring groove 14 within a certain section or predetermined angular region.

Here, the section of the guide recess 16 may be divided into sub-sections of a certain or predefined angle in a circumferential direction of the ring groove 14. A range of angle of the sub-sections of the guide recesses 16 may be varied according to the number of piston rings 18 that are to be installed.

The piston ring 18 is provided on an inner surface thereof with a guide protrusion 20 that protrudes towards the ring groove 14. The piston ring 18 is fitted into the ring groove 14 such that the guide protrusion 20 is provided within the section of the guide recess 16 so that the guide protrusion 20 can be moved only within the section of the guide recess 16.

That is, since the guide protrusion 20 is provided within the section of the guide recess 16, when the piston ring 18 is rotated along the ring groove 14, when rotated, the guide protrusion 20 that will be rotated together with the piston ring 18 engages with both step portions of the guide recess and stops rotating at those portions, so that the piston ring 18 also stops rotating.

Particularly, the end gaps 18a formed in respective piston rings 18 are formed such that when the piston rings are rotated, the end gaps 18a are moved and rotated within different rotation sections.

Thus, the rotation sections of the end gaps 18a formed in the respective piston rings 18 do not overlap with each other, so that during the normal operation of an engine, the end gaps 18a are prevented from coinciding with each other, avoiding an increase of blow-by gas.

The guide protrusion 20 may be formed on an end of the piston ring 18. That is, the guide protrusion 20 may be formed on one end side or the other end side of the piston ring 18 where the end gap 18a is formed.

However, as shown in FIGS. 3 and 4, the guide protrusion 20 may be formed on both end sides of the piston ring 18 where the end gap 18a is formed.

That is, the mounting structure of the invention is configured such that the end gap 18a is formed in the proximity of the guide protrusion 20 so as to make the rotation sections of the respective guide protrusions different, thereby naturally preventing overlap of the end gaps 18a.

Figure 6:
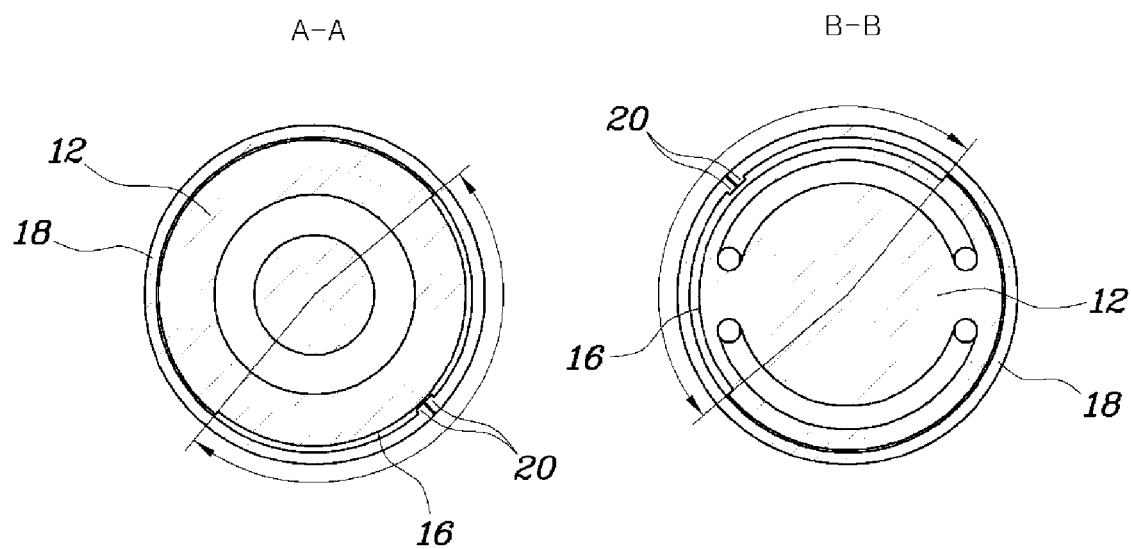
FIG. 6 illustrates two views of the piston head of FIG. 2 fitted with two piston rings, which are taken along lines A-A and B-B, respectively.
Figure 7:
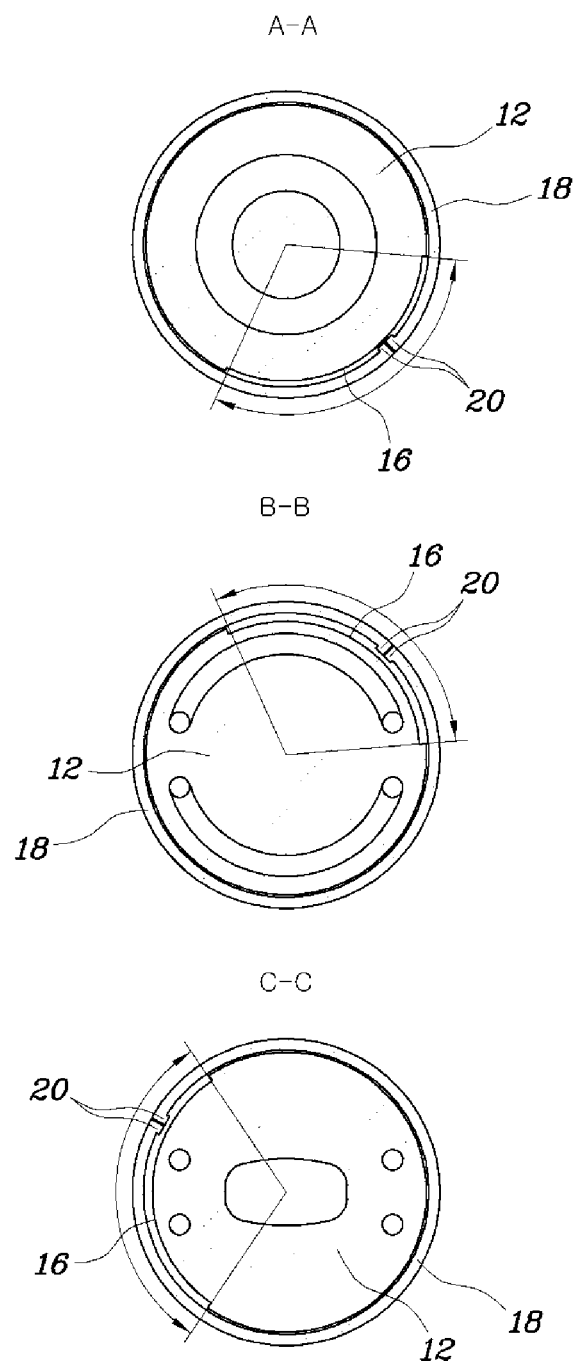
FIG. 7 illustrates three views of the piston head of FIG. 2 fitted with three piston rings, which are taken along lines A-A, B-B and C-C, respectively.

FIGS. 5A and 5B are views explaining the structures of guide recesses 16 according to the number of piston rings 18 to be mounted according to the present invention, FIG. 6 illustrates two views of the piston head 12 of FIG. 2 fitted with two piston rings 18, which are taken along lines A-A and B-B, respectively, and FIG. 7 illustrates three views of the piston head 12 of FIG. 2 fitted with three piston rings 18, which are taken along lines A-A, B-B and C-C, respectively.

Referring to FIGS. 5A, 5B, 6 and 7, the mounting structure of the invention may be configured such that when the plurality of guide recesses 16 is formed around the piston head 12, the sections along which the guide recesses 16 are formed do not coincide with each other in the circumferential direction of the piston head 12.

When the plurality of guide recesses 16 is formed around the piston head 12, the sections of the guide recesses 16 may be provided at regular intervals in the circumferential direction of the piston head 12.

That is, when two piston rings 18 are mounted as shown in FIGS. 5A and 6, the sections of the guide recesses 16 may each be formed at 180° in the circumferential direction of the ring groove 14. However, the sections of the guide recesses 16 may also be formed at an angle that is slightly smaller than 180° in order to prevent latent overlapping of end gaps 18a if possible.

Further, when three piston rings 18 are mounted as shown in FIGS. 5B and 7, the sections of the guide recesses 16 may each be formed at 120° in the circumferential direction of the ring groove 14. However, the sections of the guide recesses 16 may also be formed at an angle that is slightly smaller than 120° in order to prevent latent overlapping of end gaps 18a if possible.

As set forth in the foregoing description, the guide protrusion is provided within a section of the guide recess such that the guide protrusion is adjacent the end gap of the piston ring, so that respective rotation sections of the end gaps of the respective piston rings do not overlap with each other even when the piston rings are rotated, thereby having the effect of reducing blow-by gas.

For convenience in explanation and accurate definition in the appended claims, the terms upper, front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A structure for mounting a piston ring mounted around a piston head of a piston, wherein the piston ring has an end gap between both end sides thereof, the structure comprising:
   a ring groove formed along a circumference of the piston head with a guide recess circumferentially formed in an outer wall of the ring groove in a certain section, wherein the piston ring is rotatably fitted into the ring groove; and
   a guide protrusion formed on an inner circumference of the piston ring and provided in the section of the guide recess such that the guide protrusion is rotated within the section;
   wherein the structure is configured such that when a plurality of piston rings is respectively mounted into the guide recesses around the piston head, rotation sections of the end gaps of the piston rings are not aligned with each other.

2. The structure according to claim 1, wherein the guide protrusion is formed on an end side of the piston ring.

3. The structure according to claim 1, wherein the guide protrusion is formed on both end sides of the piston ring.

4. The structure according to claim 1, wherein the structure is configured such that when the plurality of piston rings is mounted around the piston head, the section of the guide recess in one ring groove does not coincide with the sections of the guide recesses in the other ring groove.

5. The structure according to claim 1, wherein the structure is configured such that when the plurality of piston rings is mounted around the piston head, the sections of the guide recesses formed in the respective ring grooves are provided at regular intervals in a circumferential direction of the piston head.

* * * * *